United States Patent [19]

Lavrinenko et al.

[11] 3,781,955

[45] Jan. 1, 1974

[54] METHOD OF MAKING A PIEZOELECTRIC ELEMENT

[76] Inventors: Vyacheslav Vasilievich Lavrinenko, ulitsa Klovskaya, 12/7 kv. 61; Anatoly Petrovich Miroshnichenko, ulitsa Rozy Ljuxemburg 15, kv. 23; Vitaly Alexeevich Khraschevsky, ulitsa Scherbakova, 57v, kv. 15, all of Kiev, U.S.S.R.

[22] Filed: Dec. 15, 1971

[21] Appl. No.: 208,306

[30] Foreign Application Priority Data

| | | |
|---|---|---|
| May 24, 1971 | U.S.S.R. | 1611885 |
| Dec. 21, 1970 | U.S.S.R. | 1658506 |
| Jan. 18, 1971 | U.S.S.R. | 1658786 |
| Jan. 25, 1971 | U.S.S.R. | 1608697 |
| May 31, 1971 | U.S.S.R. | 1600106 |

[52] U.S. Cl. .................. 29/25.35, 29/25.41, 29/424, 310/8.5, 310/9.6

[51] Int. Cl. .......................... B01j 17/00, H04r 17/00

[58] Field of Search ......................... 29/25.35, 25.41, 29/423, 424; 310/8.5, 9.6

[56] References Cited

UNITED STATES PATENTS

| | | | |
|---|---|---|---|
| 3,600,787 | 8/1971 | Lindsay | 29/25.41 |
| 1,219,629 | 3/1917 | Davenport | 29/618 |
| 3,519,902 | 7/1970 | Morozovsky | 317/244 X |
| 3,109,112 | 10/1963 | Lester | 310/9.6 X |
| 3,230,504 | 1/1966 | Horan et al. | 310/9.6 X |

*Primary Examiner*—Charles W. Lanham
*Assistant Examiner*—Carl E. Hall
*Attorney*—Holman & Stern

[57] ABSTRACT

The present invention relates to the instrument manufacturing industry and, more particularly, the invention relates to piezoelectric elements made in the form of a spiral, to the method of their making and to apparatus that make use of said elements, for example piezoelectric relays, piezoelectric trigger devices, a clock with a piezoelectric drive, piezoelectric step-by-step motors, measuring instruments with a piezoelectric element, piezoelectric transfilters, piezoelectric bells and piezoelectric dynamic loudspeakers. The double-layer spiral piezoelectric element includes a piezoceramic material (1), electrodes on the outer surface (2) and the inner surface (3) of the spiral, terminals (4) and (5), a support (6) for mounting the piezoelectric element, a massive base (7), an electrode (8) between the two layers of the piezoelectric material and an electrode (9).

5 Claims, 34 Drawing Figures

METHOD OF MAKING A PIEZOELECTRIC ELEMENT

The present invention relates to the instrument manufacturing industry and, more particularly, to manufacture of piezoelectric elements, methods of their manufacture and apparatus that make use of said element.

The piezoelectric element (sometimes referred to as a piezoelectric unit) is a solid body of predetermined geometrical form made of a piezoelectric material and provided with electrodes disposed to its contact surfaces. The piezoelectric element is a mechanical oscillating system with distributed parameters designed for conversion of electric energy into mechanical energy, mechanical energy into electric energy or for simultaneous double conversion of electric and mechanical energies.

Known at present are piezoelectric elements (transducers) converting electric energy into elastic mechanical oscillation in which the direction of shifting of the oscillating particles coincides with the direction of propagation of the mechanical wave.

Such elements are commonly referred to as piezoelectric elements with excited longitudinal oscillations. They are usually made in the form of slices or bars of a piezoelectric material with electrodes disposed on their side or end faces.

The stretch (elongation) of the piezoelectric elements featured by longitudinal displacement of the oscillating particles is, however, inadequate and is measured in tens or at best hundreds of microns even when they are acted on by electric fields having an intensity of near a breakdown magnitude and this limits the field of their application as devices for converting electric signals into mechanical vibration or motion. Furthermore the magnitude of this motion can be increased only at the expense of a proportional increase in the length of the piezoelectric element. For instance, in an exemplary case, to obtain a longitudinal displacement of 1 millimetre, a piezoelectric element must be employed whose length exceeds 1 metre. It is clear that such piezoelectric elements have very limited practical applications. What is more, the piezoelectric cells with longitudinal displacement of the oscillating particles are disadvantageous in that their natural resonant frequency is inversely proportional to their length. For example, the frequency of the first mechanical resonance of a piezoelectric plate 100 mm long and made of a piezoceramic material (barium titanate) is equal approximately to 30 kc, so that when a frequency of oscillation of 30 c/s is required, the length of the piezoelectric element must be 100 metres. Therefore the frequency range of application of the piezoelectric elements in which longitudinal oscillation are excited is practically restricted by the lower limit of 10 to 15 kc.

Also known in the art are piezoelectric elements with excitation of transverse oscillation, i.e., systems in which the particles oscillate in the direction normal to that of propagation of the acoustic wave. One of the best examples of such a system is a bimorph element, i.e., a piezoelectric element having two layers so polarized that during the excitation of the element each layer has a deformation of opposite sign, i.e., when one layer is compressed, the other layer is stretched (c.f. the article "Magnetic and Dielectric Elements" edited by G. V. Katz, part I, page 232 the "Energy" Publishers, 1964).

The bimorph (or bending) piezoelectric elements make it possible to obtain considerable displacements of a magnitude of several millimetres. All the same, practical applications of the bimorph piezoelectric elements are also limited. It is well known that the magnitude of bending strain is proportional to the square of the length of a piezoelectric element employed while in many devices this length is limited by a value of 20–50 millimetres.

An increase in the bending strain obtained due to reducing the thickness of a bimorph piezoelectric element is limited, too. First, from the viewpoint of the technological process it is not advisable to make elements having a thickness below 0.1 millimetre (in this case the percentage of rejects is too high) and, second, the thinner the element, the lower the effort developed by this element a condition which is also undesirable. As for the resonant frequencies of the bending piezoelectric elements, it should be noted that although these elements allow the lower frequency limit to be reduced to 50 c/s, they cannot be used in compact devices operating at frequencies below 50 c/s, since in this case the length of the bimorph piezoelectric element becomes too large.

Consequently, the known piezoelectric elements, both of longitudinal and transverse oscillation, do not comply with a large number of requirements placed upon the devices built around these elements, namely, where it is necessary to obtain considerable displacement at comparatively large efforts or where a low resonant frequency is necessary. In all these cases the device must have small overall dimensions. Such requirements are imposed upon miniature piezoelectric relays, small-size filters operating at frequencies of 1 to 100 c/s or when developing some measuring instruments.

The solution of the problem of increasing the displacements of the piezoelectric elements while simultaneously increasing their resonant frequencies is a question of vital importance since piezoelectric elements have a number of definite advantages compared with electromagnetic elements used in various devices.

The main advantage of piezoelectric elements consists in that, when operated by direct current and at low frequencies, the piezoelectric elements provide very high input impedance so that they consume negligible power (less than 100 microwatts).

An object of the present invention it to provide a piezoelectric element of such a construction as to ensure relatively large displacements and efforts at small overall dimensions of the associated piezoelectric device and also to enable the natural frequency of the mechanical oscillation of the piezoelectric element to be considerably reduced.

This object is attained owing to the fact that the piezoelectric element is made in the form of a single-layer or double-layer ribbon-shaped flat spiral coated with electrodes.

A specific object of the invention is to provide a piezoelectric element made in the form of a single-layer or double layer ribbon spiral coated with electrodes in which each small section of the element due to the inverse piezoelectricity, tends to bend and, at the same time, to elongate or to contract. In this case on some sections of the piezoelectric element the longitudinal strain will have opposite signs so that the longitudinal displacement of the end of the spiral will be near zero. As for the bending strain, which will have a single sign, owing to the fact that each section of the spiral is bent, its displacement will occur practically along the spiral coils, i.e., in the direction of propagation of the mechanical wave.

Consequently, in the case of a spiral piezoelectric element the bending strain will for the most part be converted into longitudinal strain and due to this effect the spiral piezoelectric element belongs to the longitudinal-displacement piezoelectric elements.

Still another object of the invention is to provide a method of making a spiral-shaped piezoelectric element as well as a method of manufacture of articles that make use of said elements.

These and other objects are attained by a making a piezoelectric element in the form of a spiral.

The spiral may be made in the form of a closed coil of a piezoceramic material.

It is desirable to make the spiral in the form of a ribbon consisting of at least one layer.

The cylindrical or conical surfaces of each layer of the spiral are preferably covered with a current-conducting film.

One of the cylindrical or conical surfaces of the spiral may be coated by a current-conducting film while the other may be made of at least two current-conducting films electrically insulated one from the other.

At least one layer of the spiral should be polarized in the transverse direction.

The single-layer piezoelectric element is preferably made by the method in which there is obtained an unfired piezoceramic ribbon containing a substance based on oxides sintered at a temperature of 900°–1300°C, for example BaO and $TiO_2$, and an organic substance, for example rubber, and, in addition, there is obtained an unfired ribbon containing a substance based on oxides sintered at a temperature of 1350°–1400°C, for example $Al_2O_3$. Both these ribbons are laid on each other, coiled into a spiral and fired at a temperature of 900°–1300°C and, after cooling the spiral, the $Al_2O_3$ is removed from the gaps between the spiral turns.

The single-layer piezoelectric element may be prepared by a method in which the obtained spiral is immersed into a liquid paste containing salts or oxides of metal, after which the spiral is withdrawn from the liquid, dried and fired at a temperature such that the metals are obtained from the salts or oxides. The spiral is then separated from the extra metallic coating.

It is also expedient to employ a method of making a single layer piezoelectric element may also be prepared by a method which results in the obtaining of an unfired piezoceramic ribbon containing a substance based on oxides to be sintered at a temperature of 900°–1300°C, for example BaO and $TiO_2$, and also containing an organic substance, for example rubber, the required portions of the ribbon surfaces being coated with a film of a paste of salts or oxides of metal, for example platinum. In this case there is additionally obtained an unfired ribbon containing a substance based on oxides to be sintered at a temperature higher than 1350°–1400°C, for example $Al_2O_3$. Both ribbons are laid one upon the other, coiled into a spiral and fired at a temperature of 900°–1300°C. After cooling the spiral, the $Al_2O_3$ is removed from the gaps between its turns.

The double layer piezoelectric element may be prepared by a method in which there are obtained two main unroasted piezoceramic ribbons containing a substance based on oxides to be sintered at a temperature of 900°–1300°C, for example BaO and $TiO_2$, and an organic substance, for example rubber, which are coated with a film of a paste of salts or oxides of metals, and there is additionally obtained an unfired auxiliary ribbon containing a substance based on oxides to be sintered at a temperature higher than 1350°–1400°C, for example $Al_2O_3$. The two main films are placed one upon the other and pressed, for example, in a roll mill, after which the auxiliary ribbon is laid on the main films and the entire assembly is coiled into a spiral and fired to a temperature of 900°–1300°C. After the spiral has been cooled, the $Al_2O_3$ is removed from the gaps between the spiral turns.

An electric relay may be advantageously built around the spiral piezoelectric element.

An electric relay may be produced by employing at least two spiral piezoelectric elements inserted one into the other. Also, an electric clock may be constructed with a transducer converting electrical energy into mechanical oscillation of the balance wheel built around a spiral piezoelectric element.

An electrical measuring instrument may be built around a spiral piezoelectric element.

An electric filter integral with a transformer (transfilter) may be built around at least a single spiral piezoelectric element.

A step-by-step motor with an electric drive acting on a gear wheel may be built around a spiral piezoelectric element.

An electric bell may be built around a spiral piezoelectric element.

A transducer converting electric energy into sound energy, for example a dynamic loudspeaker, may be constructed by employing at least one spiral piezoelectric element.

The present invention will be better understood from the following detailed description, reference being made to the accompanying drawings where a specialized terminology is employed to clarify the description of the invention. It should be noted, however, that the invention is not limited by the given narrow terms and that each term includes all the equivalent elements operating in a similar way and used for solving the same problems as those solved by this invention.

It should also be noted that other objects and advantages of the invention will be apparent from the following description of some embodiments of the invention with reference to the accompanying drawings, in which.

Figure 19A:
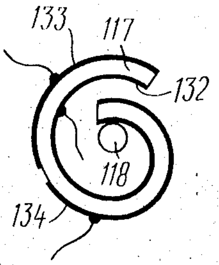
Figure 19B:
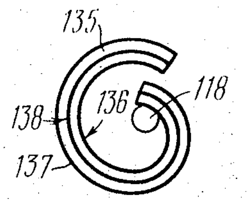
Figure 22:
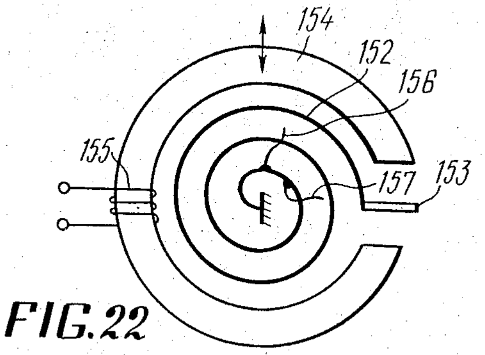
Figures 11, 11A:
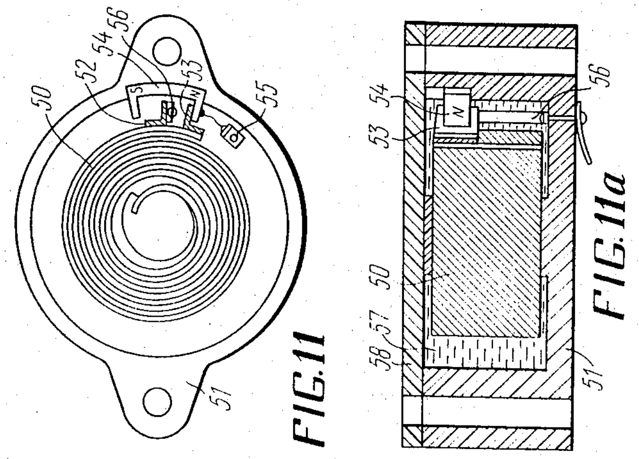
Figures 8, 8A:
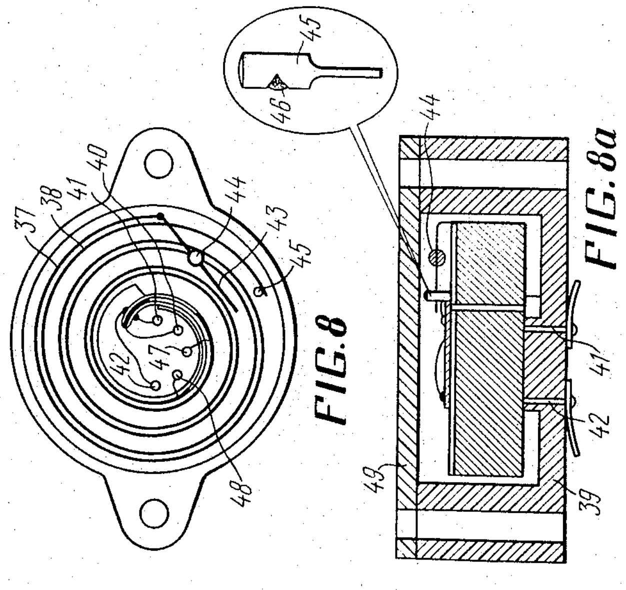
FIG. 8 is a top view of the piezoelectric relay with two spiral elements.
Figure 9:
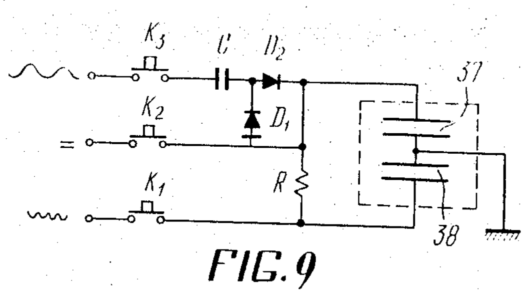
Figure 10A:
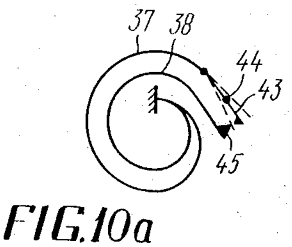
Figure 10B:
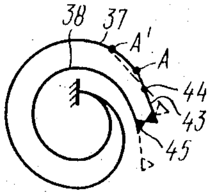
Figure 14:
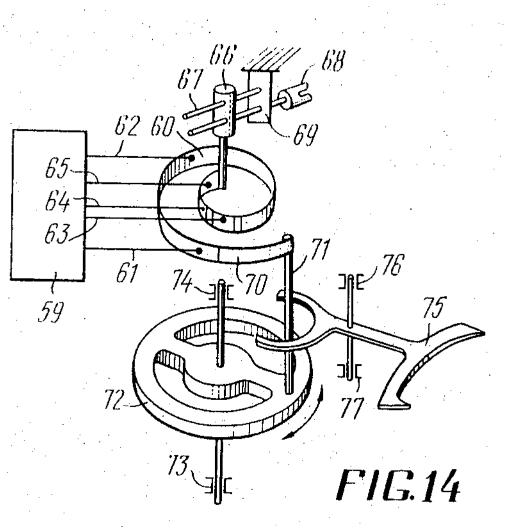
Figures 13A, 13B, 13C:
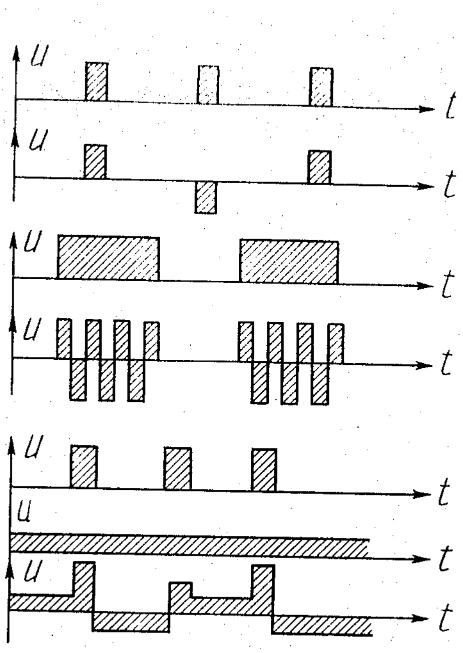
Figure 12:
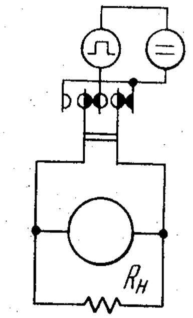
Figure 15:
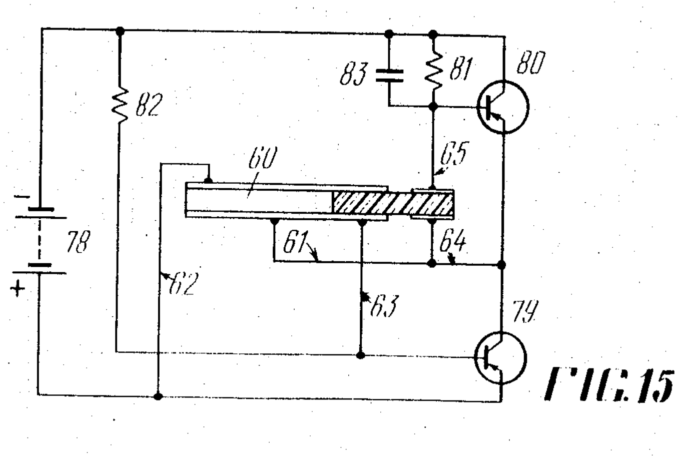
Figures 16, 16A:
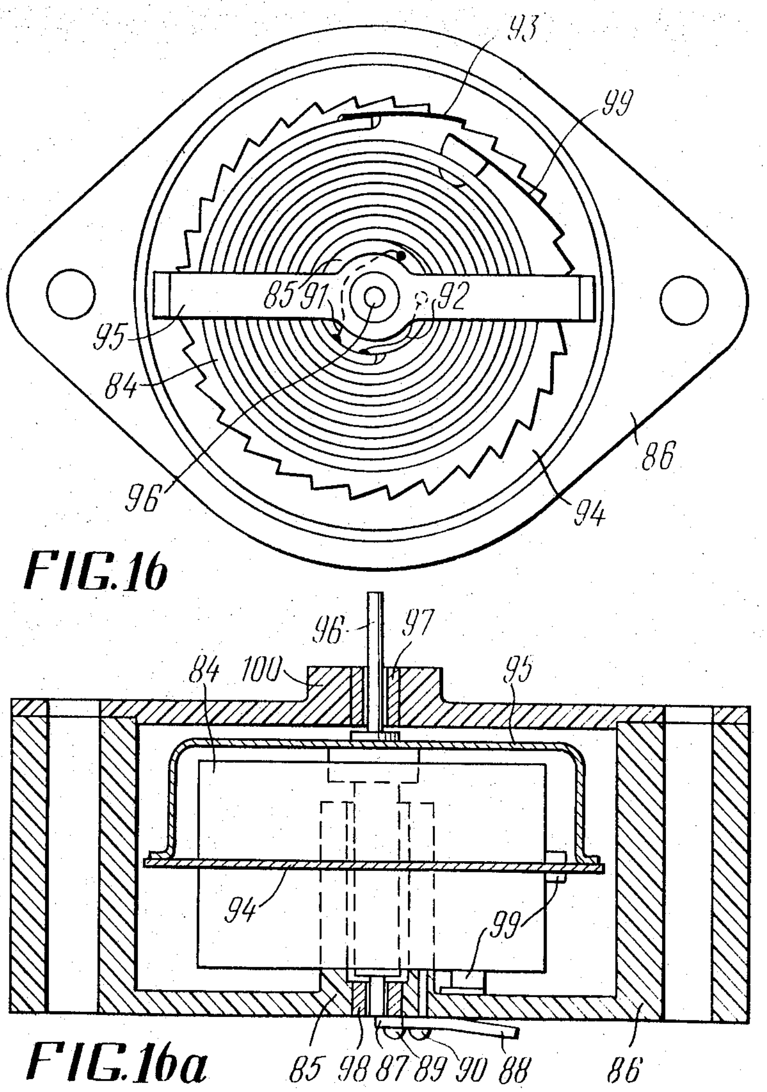
Figure 17:
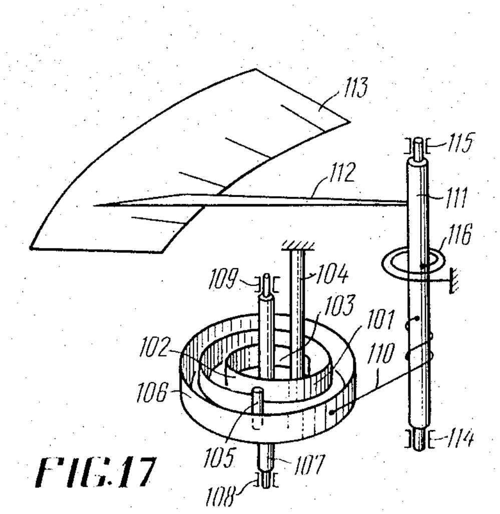
Figure 18:
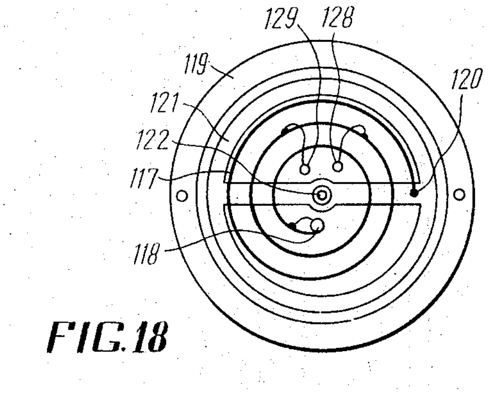
Figure 18A:
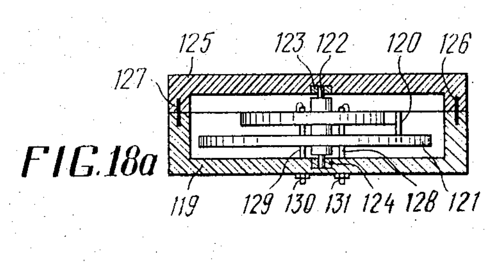
Figure 20:
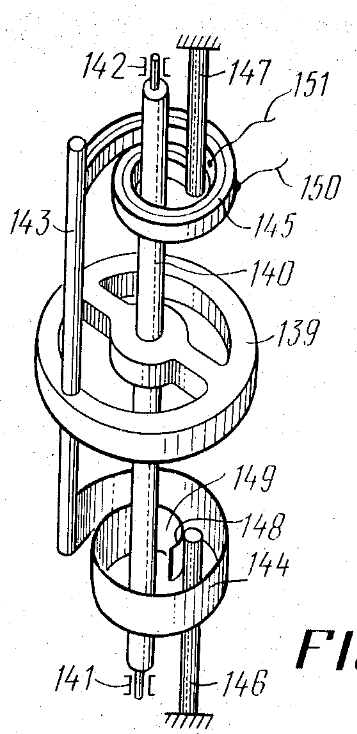
Figure 21A:
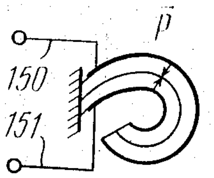
Figure 21B:
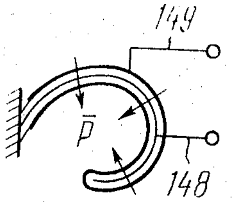
Figure 23A:
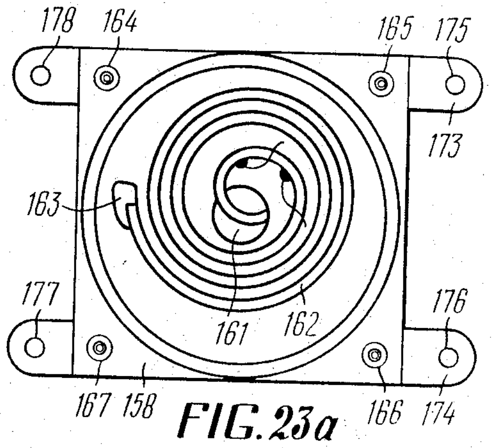
Figure 23:
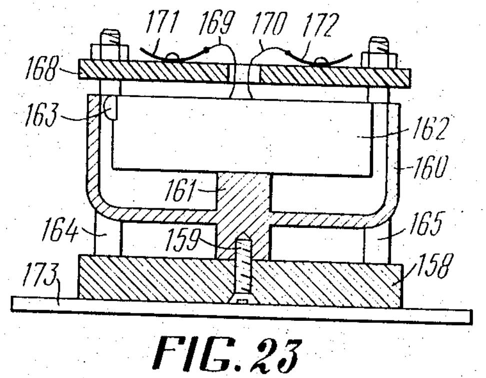
Figure 24:
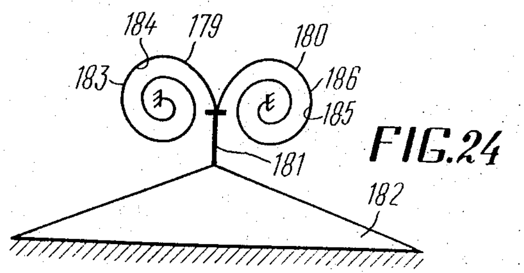

FIG. 8*a* is a side sectional view of the piezoelectric with two spiral elements;

FIG. 9 is a schematic diagram of the piezoelectric relay with two spiral elements;

FIGS. 10*a* and 10*b* are functional diagrams of the piezoelectric relay with two spiral piezoelectric elements;

FIG. 11 is a top view of the piezoelectric trigger device with a removed cover;

FIG. 11*a* is a side sectional view of the piezoelectric trigger device;

FIG. 12 is a schematic diagram of the piezoelectric trigger device;

FIGS. 13*a* – 13*c* are voltage pulse diagrams of the piezoelectric trigger device;

FIG. 14 is a functional diagram of the electric clock with a piezoelectric drive;

FIG. 15 is a schematic diagram of the transducer for the clock drive;

FIG. 16 is a top view of the piezoelectric step-by-step motor with a removed cover;

FIG. 16*a* is a side sectional view of the piezoelectric step-by-step motor;

FIG. 17 is a functional diagram of the measuring instrument with a spiral piezoelectric element;

FIG. 18 is a top view of the piezoelectric transfilter with a removed cover;

FIG. 18*a* is a side sectional view of the piezoelectric transfilter;

FIG. 19*a* is a schematic diagram of the single-layer spiral piezoelectric element (transfilter);

FIG. 19*b* is a schematic diagram of the spiral bomorph piezoelectric element (transfilter);

FIG. 20 shows the piezoelectric transfilter with two spiral piezoelectric elements;

FIGS. 21*a* and 21*b* are schematic diagrams of the input (*a*) and output (*b*) elements of the piezoelectric transfilter;

FIG. 22 is a functional diagram of the piezoelectric transfilter with mechanical and electric control of the resonant frequency;

FIG. 23*a* is a top view of the piezoelectric bell with a spiral piezoelectric element (the cover of the bell is removed);

FIG. 23 is a side sectional view of the piezoelectric bell;

FIG. 24 is a functional diagram of the dynamic loudspeaker with two spiral piezoelectric elements.

Figure 1:
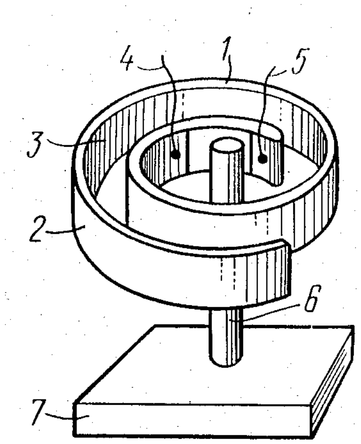
FIG. 1 shows a construction of the longitudinal-displacement spiral piezoelectric element.

The spiral piezoelectric element (FIG. 1) concludes a piezoelectric material 1, electrodes provided on the outer 2 and inner 3 surfaces of the piezoelectric spiral, terminals 4 and 5, a support 6 for mounting a piezoelectric element, a massive base 7, an electrode 8 (FIG. 2) between the two layers of the piezoelectric material and an electrode 9.

The spiral piezoelectric elements are made of materials having a high piezoelectric activity such as ceramic materials of the group lead zirconate titanate (PZT) or those based on barium titanate. The contact surfaces are metallized by burning-in silver or platinum paste. In the case of the bimorph piezoelectric spirals (FIG. 2) the electrode 8 is burnt-in at a sintering point of the ceramic material and, because of this, it can be solely platinum, palladium or made of an alloy based on these metals.

Figure 2:
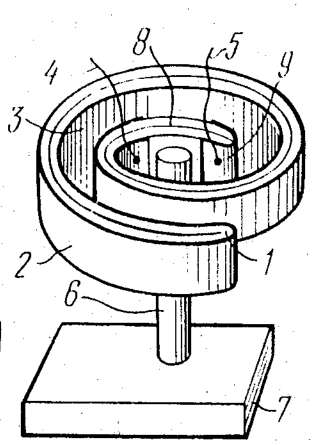
FIG. 2 shows a construction of the double-layer (bimorph) spiral piezoelectric element.

The piezoelectric element is attached to one end of the spiral (generally the inner end). The spiral is mounted by gluing it to the support 6 secured to the massive foundation 8 which usually is an integral part of the housing of the piezoelectric element. The terminals 4 and 5 are soldered to the current-conducting layers at the place of minimum amplitude of the oscillation, i.e. at the support 6. To provide for convenient soldering of the terminal 5, the electrode 2 is passed through the end face of the spiral to the inner surface of the first coil thereof and is separated from the electrode 3 by a narrow non-conducting strip. In the bimorph spiral piezoelectric elements the electrode 2 is connected to the electrode 3 through a free end face as shown in FIG. 2. The electrode 8 is led to the inner and outer surfaces of the first turn of the spiral and is separated from the electrodes 3 and 2 by thin straps. This allows one to easily make a terminal 5 from the electrode 8.

After burning-in the electrodes and soldering the terminals, the piezoelectric material have to be polarized and this is effected by applying a direct-current voltage to the electrodes 2 and 3.

For this purpose the electrodes 2 and 3 are not connected at the end face of the bimorph spiral piezoelectric element and only after the polarization are they connected to each other by a method of chemical deposition of copper or nickel. The polarization, as a rule, is effected at a temperature of 100°–160°C depending on the material.

When the terminals 4 and 5 are connected to a voltage source, the free end of the spiral is free to travel.

The direction of movement of each point of the surface of the spiral approximately coincides with the tangent drawn through the given point. The experiments have shown that the magnitude of the displacement is proportional to the square of the length of the involute of the spiral and is inversely proportional to the square of the thickness of the spiral turns. The displacements obtained for the spiral of several turns have been equal to up to 10 mm. Much greater displacements can be obtained if necessary.

The magnitude of the displacements for the bimorph spiral piezoelectric elements is somewhat higher than that for the single-layer spiral piezoelectric elements (at the same dimensions of the devices and applied voltages).

This occurs due to the fact that in the case of the single-layer spirals the displacements are caused solely by the bending effect in thin ceramic plates which has been recently discovered by the inventors. The bimorph plates, while manifesting this effect, have an inverse piezoelectric effect which results in elongation of one layer and construction of the other layer of the spiral piezoelectric element.

However, the single-layer spiral (FIG. 1) can always have a thickness twice as small as that of the bimorph spiral (FIG. 2), therefore, its absolute displacement exceeds that of the bimorph spiral while its resonant frequency is lower. Furthermore, it does not require an expensive platinum coating and is much simpler in manufacture. All the same, when very high sensitivity (mechanical displacement per unit of applied voltage) is necessary, a bimorph spiral piezoelectric element is employed.

As mentioned above, the spiral piezoelectric element has a number of advantages but, at the same time, it is very difficult to manufacture. Conventional spirals are usually made by coiling the starting material, but a ceramic plate is too fragile to be coiled into a spiral. Among the known technological processes the one suitable for solving this problem consists in cutting a spiral from a ceramic plate by the method of supersonic treatment. However, this process is expensive and has a number of disadvantages. First, thin-film bimorph piezoelectric elements cannot be made by using any mechanical process which is suitable for making single-layer elements only. Second, manufacture of the spirals having a thickness less than 0.3 mm with gaps of the same value is an impracticable problem even with the aid of modern supersonic equipment taking into consideration that the spirals must have a specified height. In addition, in the process of supersonic treatment of ceramics an abrasive material, for example powdery silicon carbide, is used which causes numerous surface defects in the form of microcracks.

The development of these microcracks during the oscillation of the spiral results in its destruction.

Also known in the art is a method of making thin ceramic slip films. This method is widely used for making thin-film multilayer ceramic capacitors. In this method powder of a semi-fired ceramic charge is mixed with a solution of rubber in petrol and a suspension is obtained which is called a slip mass. This slip mass is poured onto polyethylene backings in a special machine. The solvent evaporates, thus leading to formation of sufficiently elastic slip film consisting of fine grains of ceramic material bound by the rubber. This film is readily separated from the backing and can be coiled into a spiral due to its elasticity. This method, however, is not suitable for making a spiral piezoelectric element because the ceramic film heated to a sintering point (1100°–1300°C) becomes so elastic that the gap between its turns disappears due to the deformation of the film and the spiral turns are sintered to each other, i.e. the required piezoelectric cannot be obtained. Thus, still another object of the invention is to provide a method of making a spiral piezoelectric element which will make it possible to obtain a spiral piezoelectric device having a predetermined gap between the turns of the spiral.

This object is attained due to the fact that applied on a ceramic slip film (FIG. 3) on one side are a thin organic film, then a slip film of aluminum oxide or zirconium dioxide whose thickness is determined by a required gap between the turns. Thereafter, a thin organic film is laid on the pack again.

After that the whole pack is coiled into a spiral so that the slip piezocermaic film is on the inner side of the surface of the spiral turns.

The pack includes slip films 10, 11 (FIG. 3) of piezoelectric composition coated with a platinum paste 12, 13, 14. Two organic films 15, 16 and one slip film comprising an inorganic material 17 (for example aluminium oxide or zirconium dioxide) which is not sintered at the firing temperature of the ceramics (900°–1300°C) but is sintered at a temperature at least higher than 1350°C. After having been coiled into a spiral (FIG. 4), the pack is fixed by a strengthening thread 18.

The spiral piezoelectric elements are therefore made in the following succession:

In the first stage the slip films 10, 11 and 17 are made by using a conventional process of manufacture of slip films. The charge for making the films 10 and 11 may be composed of barium titanate or any other piezoelectric material containing 5 to 15 percent by weight of binding agent. The charge for making the film 17 may be composed of any material which is not sintered at the firing temperature of the ceramics (for example aluminium oxide or zirconium dioxide).

The films 10 and 11 are coated at one or at both sides with a platinum paste and are dried at a temperature of about 100°C. Then they are laid one upon the other but so that at least one layer of the platinum paste is between the two layers. After that the two layers are run between the rolls of a rolling mill for joining the films and for sizing their thickness.

All the films including the organic films 15 and 16 (which usually consist of a thin capacitor paper) are used for cutting therefrom blanks of the same area. The length and width of the blanks correspond to the sizes of the spiral to be made.

Figure 3:
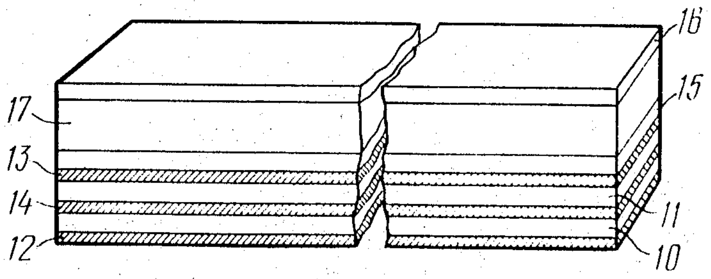
FIG. 3 shows a pack of slip films.
Figure 4:
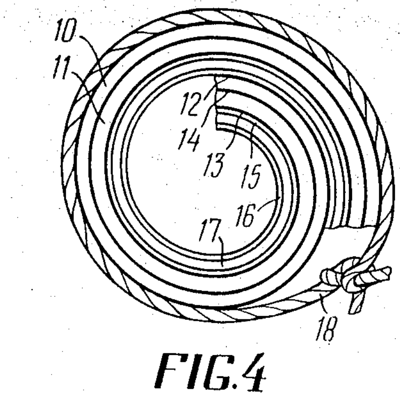
FIG. 4 shows a pack of slip films coiled into a spiral.

After that the pack is assembled as shown in FIG. 3, then coiled into a spiral and secured by the strengthening thread as shown in FIG. 4.

The blank is placed into a capsule and the latter is filled with a charge, for example aluminium oxide or zirconium dioxide. The capsule is placed into a furnace and is fired to a temperature of sintering the ceramics (900°–1300°C). In this case all the organic substances are burnt out, the piezoceramic grains are sintered and the platinum is reduced from its compounds.

The blank is cooled down and is glued to a backing through its base. Then the blank is cut by height into several separate spirals by means of a diamond saw with an integral cutting edge. The grains of inorganic material filling the gap between the turns of the spiral are removed by an air jet. The terminals are soldered and the piezoelectric material is polarized under the action of an electric field and temperature.

The spirals can also be made without using the intermediate organic films 15 and 16, however, in this case it is difficult to remove the grains of non-sintered inorganic material.

When making the single-layer spirals, the slip film 10 is not coated with a platinum paste for reducing the cost of the piezoelectric element. The contact surfaces are metallized on the finished spiral. As a rule, this is effected by immersing the spiral into a sufficiently liquid silver paste followed by drying and roasting the silver paste at a temperature of 500°–850°C.

When making the spiral piezoelectric elements by the abovedescribed method, it is possible to avoid the appearance of defects (microcracks) on the spiral surface. In this case the thickness of the turns can be reduced to 0.1 and even to 0.05 mm.

No special equipment is necessary for making the spiral piezoelectric elements (except for a few simple tooling sets). This, as well as a simple process for manufacture, provides for a low production cost of the spiral piezoelectric element (which is substantially determined by the cost of the starting materials).

The provision of high-displacement piezoelectric material in the form of a piezoelectric spiral opens up possiblities for using it in such contact devices as electromechanical relays. The modern requirements imposed on the dimensions of the relays, their weight and consumed power become more and more stringent in connection with the general tendency for microminiaturization of electronic equipment. In many cases electromagnetic relays cannot meet these requirements because the principles of their operation are at variance with the demands for small dimensions and low current consumption of such devices. In fact, the lower the consumed current, the higher number of turns in the winding must be provided and this is associated with a high effective resistance and high thermal losses.

A decrease in the dimensions of the relay does not lead to a proportional decrease in the consumed power, consumption of labour, cost, etc. because any decrease in the dimensions is associated with a decrease in the size of the magnetic circuit, therefore in increase of the number of turns. The presently known relays have up to 15000 turns of the thinnest wire, but even these are still far from meeting the requirements of small dimensions and low power consumption.

Thus, the solution of the problem of low dimensions and consumed power of relays can be obtained only on a principally novel basis, i.e. it is necessary to develop such devices whose characteristics improve with a decrease in their dimensions or at least will not deteriorate.

Piezoelectric relays comply with these requirements. Known at the present time are piezoelectric relays built around cantilevered bimorph piezoelectric elements. However, mechanical displacements and contact pressures in such relays are insufficient for employing them on a wide scale. The magnitude of displacement is increased by making a piezoelectric element in the form of a number of acoustically connected bimorph cells (cf. USSR Author's Certificate No. 219699).

Such devices allow one to obtain large mechanical displacements at sufficiently high levels of an electric signal, however, their manufacture is associated with considerable technological difficulties. Moreover, the resistance of such relays to the action of external mechanical loads is very low. Even a minute external force acting on the relay results in its false operation.

Thus, an object of the invention is to provide a piezoelectric relay based on a spiral piezoelectric element, in which case the dimensions of the relay are considerably reduced while decreasing the pull-in voltage of the relay and its sensitivity to the action of external mechanical efforts.

This object is attained owing to the fact that the electromechanical portion of the relay is made in the form of a spiral piezoelectric element having one end rigidly secured and the other end connected to a rotary lever with a neutral contact.

Figure 5:
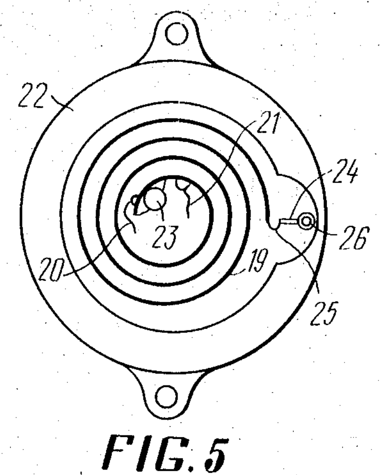
FIG. 5 is a top view of the piezoelectric relay with a removed cover.
Figure 6:
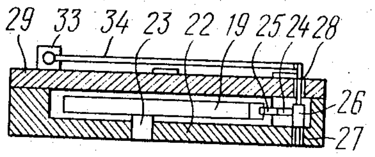
FIG. 6 is a side sectional view of the piezoelectric relay
Figure 7:
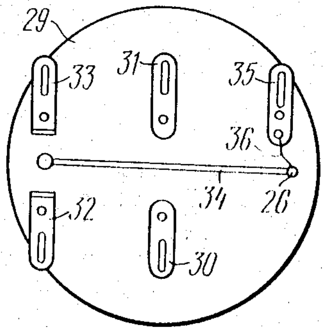
FIG. 7 is a view of the contact system of the piezoelectric relay.

The relay includes a single-layer or bimorph spiral piezoelectric element 19 (FIG. 5) whose inner and outer surfaces are metallized. Soldered to the contact surfaces are terminals 20 and 21. The spiral is placed in the bottom portion of the housing 22 and is rigidly secured relative to the housing walls by means of a support 23 one end of which is fixed to the bottom portion of the housing. The movable end of the spiral piezoelectric element is connected to the rotary lever-24 by means of a spring 25. The lever fulcrum consists of a metal axle 26 which is mounted in the openings 27 and 28 of the housing. Secured to the bottom portion of the housing is a cover 29 on which there are mounted two tongues 30 and 31 (FIG. 7). These tongues through the current-conductive terminals 20 and 21 are connected to the contact surfaces of the piezoelectric spiral 19. The tongues 32 and 33 (FIG. 7) serve as contacts of the relay. The third contact 34 is connected to the axle 26 and to the tongue 35 through a thin terminal 36 (FIG. 7).

When a voltage is applied to the tongues 30 and 31 (FIG. 7) the spiral is coiled or uncoiled depending on the polarity of the voltage. The end of the spiral connected to the rotary lever performs a translatory motion thereby rotating the axle 26 in the bearings 27 and 28 and transmitting an effort to the contact 34. The latter displaces and touches either the contact 32 or the contact 33 depending on the polarity of the applied voltage. The contacts are closed so far as the voltage applied to the plates of the spiral exceeds the operating voltage (pull-up voltage) of the relay. In this case the relay operates as a three-position device.

The relay can operate under the other conditions when the contact 34 is disposed so that it is pressed to the contact 32 when no voltage is applied to the plates of the relay. On applying a voltage exceeding the polarization voltage of the piezoelectric element, the end of the spiral displaces. In this case, after removing the voltage, residual deformation occurs in the piezoelectric element keeping the end of the spiral in a new position. The contact 34 remains being closed with the contact 33. The operating position of the relay is changed by applying a repolarization pulse to its plates. This two-position relay consumes no electric energy after it has been operated.

The mechanical resistance of the relay is obtained by means of placing the piezoelectric spiral 19 with a minimum gap relative to the plastic housing. In case of an impact the outer turn lays on the housing walls due to its flexiblity, whereas the inner turns lay on each other so that the system can withstand considerable mechanical overloads. Since the turns of the spiral piezoelectric element are located concentrically relative to its point of support, the sensitivity of such relay to external mechanical overloads is considerably lower than that of the known piezoelectric relays made in the form of several bimorph elements connected one to another.

Finally, it should be noted that the power consumed by the relay with a piezoelectric element is expressed by the magnitude of 100 microwatts and this is almost 1000 times as small as the power consumed by any known commercial electromagnetic relay. The operating current of the proposed piezoelectric relay is less than $10^{-6}$ ampere and this allows this relay to be used in combination with various high-resistance current sources.

The above-considered design of the relay with a spiral-type piezoelectric element is characterized by good mechanical and electrical parameters and can be used in many electrical and electronic devices.

In some cases, however, such relays have insufficient sensitivity, operational speed and permissible currents flowing through their contacts.

In order to improve these characteristics, the electromechanical portion of such a relay is made in the form of two piezoelectrical spirals inserted one into another and having contacts at their ends, in which case one of these contacts is made as a half-wave metal plate carrying an inertia mass while the other contact is made as a drop of mercury placed into a metallic ampoule.

The piezoelectric relay comprises two spiral piezoelectric elements 37 and 38 (FIG. 8) inserted one into another and having one end rigidly secured in a housing 39 (FIG. 8*a*). The generating surfaces of the spiral piezoelectric elements are metallized except for a narrow belt (the metallized part of the surfaces is blackened in FIG. 8). The upper end faces of the spirals are also metallized.

Two metallized generating surfaces of the spiral piezoelectric elements are connected in parallel and through a wire are connected to a terminal rod 40. The other two metallized generating surfaces are connected through wires to terminals rods 41 and 42.

Located on a free end of one of the spiral piezoelectric elements is a metal plate 43 glued to the end-face current conductor. In the middle of the plate there is secured a mass 44. Mounted on the free end of the other spiral piezoelectric element is a metal pipe 45 one end of which is sealed off while the other end is squeezed. The pipe is filled with mercury which wets its surface. The pipe is provided with a slot 46 through which passes the mercury meniscus. To provide for a convex meniscus, the walls of the slot are varnished. The pipe 45 and the plate 43 serve as contacts of the relay. These contacts are electrically connected to the terminal rods 47 and 48 (FIG. 8) through the end-face current conductors and wires. When assembled, the cover 49 is glued to the housing 39 thus providing for hermetic sealing of the relay.

When the spiral piezoelectric element is connected to a source of alternating current, by momentarily depressing the push-button $K_1$ (FIG. 9), the end of the spiral 37 comes into action and its motion is transferred to the contact 43 (FIG. 10).

At a resonant frequency of oscillation of the plate 43 (which is selected by the mass 44), even if alternating-current voltage of 1 volt is applied, the amplitude of oscillation of the plate 43 is equal to several millimetres.

In this case as fast as the plate 43 touches the convex meniscus of the mercury, the surface tension forces pull it into the mercury bulb. The oscillation of the plate and of the spiral piezoelectric element is immediately damped while the surface tension forces reliably hold the contacts in a closed state after deenergizing the relay. Thus, the relay consumed no current in the switched-on state. To return the relay to its initial position, the push-button $K_2$ (FIG. 9) is depressed which applied a direct-current voltage to both spiral piezoelectric elements thereby causing in them deformations of opposite signs and, as a result, breaking of the contacts.

The mobility of two spiral piezoelectric elements is higher than that of a single piezoelectric element of a double length therefore the response of the relay is increased almost by a factor of two.

The relay can also be switched off by means of an alternating current of any frequency. For this purpose, the push-button $K_3$ (FIG. 9) is depressed, which applies an alternating-current signal to the input of a voltage amplifier (elements C, $D_1$ and $D_2$ in FIG. 9). The rectified signal is fed to the spiral 37 and through a resistor R (FIG. 9) to the spiral 38.

Under all operating conditions the relay consumes electric energy only at the moment of making or breaking its contacts. The consumed power at the moment of switching in this case does not exceed 0.1 milliwatts, while the mercury contact can commutate power of ten watts.

A contact device has been previously described comprising an electromechanical drive in the form of a spiral piezoelectric element with contacts secured on its free end.

Such a device can be used as a polarized relay, i.e. it is commutated depending on the polarity of the applied electric pulses. However, automatic and telemechanical devices are often controlled by pulses of a single polarity. In this case the relay is connected to a trigger circuit which converts the unipolar pulses into a direct-current voltage of different polarity. The auxiliary trigger circuit necessary for providing unipolar operation of the relay is a significant disadvantage of the above device. This disadvantage is eliminated by making a piezoelectric relay operating from a source of unipolar pulses.

Thus, still another object of the invention is to provide a relay with unipolar triggering or, in the same, vein an object of the invention is to simplify the construction of the relay with unipolar triggering.

This object is attained owing to the fact that the free end of a spiral piezoelectric element is equipped with two contacts made of electroconductive magnetic material, one contact being connected to the outer metallized surface of the spiral piezoelectric element and the other contact being connected to the inner metallized surface of the same. These movable contacts are located between two stationary contacts made in the form of permanent magnets with current-conducting surfaces electrically connected to each other, while the third stationary contact is located between the two movable contacts.

Mounted on the movable end of the spiral piezoelectric element 50 (FIG. 11) the internal end of which is secured in the housing 51 are contacts 52 and 53, one of which is electrically connected to the inner and the other to the outer metallized surfaces of the spiral piezoelectric element. The stationary contacts 54 consist of permanent magnets. When using materials which do not conduct an electric current (for example ferrites) a current-conducting film is chemically applied onto their surface for making an electric contact.

The contacts 54 are connected to the terminal rod 55 of the current conductor while the stationary contact 56 is secured in the housing and is located between the two movable contacts 52 and 53.

The electrical and mechanical strength of the relay can be increased by filling it with oil 57. The cover 58 (FIG. 11*a*) is glued to the housing 51 thus hermetically sealing the device.

In the initial position the contacts 53 and 54 are closed, the contacts 52 and 56 are also closed. The direct-current pulse applied to the contacts 54, 56 and therefore to the electrodes of the spiral piezoelectric element causes bending deformations in the latter which tend to uncoil the spiral piezoelectric element and to displace its movable end. However, the displacement of the movable end of the spiral piezoelectric element is prevented due to the presence of magnetic attraction between the contacts 53 and 54. When the magnetic forces are equal in magnitude to the mechanical forces, the device operates, the movable end of the spiral piezoelectric element displaces and results in breaking the contact pairs 53, 54 and 52, 56 and in closing the contacts 52 and 54 as well as of the contacts 53 and 56.

In this state the relay can be held during any interval of time due to the action of the magnetic forces between the contacts 52 and 54.

The following direct-current pulse (of the same polarity as the preceding pulse) applied to the contacts 54 and 56 causes bending deformations in the spiral piezoelectric element which tend to coil the spiral piezoelectric element and to displace again the spiral piezoelectric element but this time in the opposite direction. When the magnetic forces are equal in magnitude to the mechanical forces, the relay operates, and the system returns to its initial position, namely the contacts 53 and 54 as well as the contacts 52 and 56 are closed.

FIG. 12 shows one of the methods of connection of the device. By applying a number of positive pulses of a definite duration to the device, we will get a number of pulses on the load where each even pulse will already be negative (FIG. 13*a*).

By connecting a diode bridging the negative pulse to the load, we will get at the output of a number of positive pulses having a repetition frequency twice as small as the repetition frequency of the triggering pulses.

In addition, taking into account the possibility of repolarization of piezoceramic materials in even spot cycles, it is possible to select such a magnitude of the triggering pulses at which the device will operate from ($n$)-pulse thus providing for division coefficient ($2n$).

When a voltage pulse of a considerable duration is applied to the device, it results in that during the action of this pulse the device is triggered several times and at its output there is produced an alternating signal whose frequency will be determined by the amplitude of the exciting pulse (FIG. 13*b*). In this case the device operates as a generator.

When a direct-current voltage of a definite magnitude and unipolar triggering pulses are simultaneously applied to the device it can be used as an electromechanical trigger (FIG. 13*b*).

Thus, the proposed construction of the relay with unipolar triggering may be termed as an electromechanical triggering device which can perform functions of a relay with unipolar triggering; a frequency divider with a division factor of 2 and higher ($2n$); a trigger circuit, i.e. the circuit converting unipolar pulses into direct-current voltage of different polarity; and a low frequency oscillator.

It should be also noted that, instead of the contacts in the form of a permanent magnet, mercury contacts can be used as in the above-described mercury-contact relay. In this case the threshold of operation will be determined by the forces of surface tension of the mercury.

A spiral piezoelectric element is a mechanical oscillatory system with distributed parameters and differs from all mechanical oscillating systems made in the form of springs and spirals of metals or piezoelectric dielectric materials in that the spiral piezoelectric element converts one kind of energy (electric energy) into another kind (mechanical energy), whereas all the known spirals perform mechanical oscillation (i.e. execute vibratory motion) only under the action of external mechanical forces. This advantageous property of the proposed spiral piezoelectric elements makes it possible to considerably simplify the clock mechanisms equipped with a balance wheel.

At present the clocks with a balance wheel and an electromagnetic drive are widely used in industry and household. For example, the Russian-made table clocks with a trade mark "Majak" have gained general recognition and are in a great demand despite a rather high price.

The principle of operation of the known electromechanical clock is based on the interaction of magnetic fields. A low-frequency alternating current flows through the winding of an electric magnet and produces a variable magnetic field. Affected by this field is a small permanent magnet secured on a balance wheel having a return spring commonly referred to as a hairspring. The interaction between the magnetic fields and the balance spring results in oscillation of the balance wheel with a constant frequency. The disadvantage of such a clock consists in that its construction is relatively complicated and is associated with a high consumption of labour during manufacture which to a great extent is determined by the amount of the components requiring high accuracy in their making.

An object of the present invention is to simplify the construction and to reduce the labour consumption in manufacture of the electromechanical clock.

This object is attained due to the fact that the transducer for converting electric voltage into mechanical oscillation of the balance wheel is made in the form of a spiral piezoelectric element.

The transducer (or voltage changer) 59 shown in the functional diagram (FIG. 14) is connected to a spiral piezoelectric element 60 through terminals 61, 62, 63, 64, 65. One end of the spiral piezoelectric element 60 is rigidly secured to a movable rod 66 capable of moving along a guide 67 by means of a microscrew 68. The guide 67 is secured to the step 69 of the clock casing.

The second end of the spiral piezoelectric element is secured to a thin metal plate 70 which, in turn, is secured to the rod 71 located on the clock balance 72.

The balance is mounted in bearings 73, 74, the motion from the balance system is transmitted to an anchor device 75 mounted in bearings 76 and 77 and associated with a timer.

The transducer system comprises a direct-current power source 78 (FIG. 15) a spiral piezoelectric elements 60, transistors 79 and 80, bias resistors 81, 82 and a triggering capacitor 83 bridging the resistor 81.

The system consists of a self-excited push-pull oscillator.

On switching on the power source 78, the transistor 79 is rendered conductive due to the current flow through the resistor 82. At this moment the input capacitor of the spiral piezoelectric element is charged through the current conductors 62, 61, then through the emitter-base path of the transistor 80 and through the triggering capacitor 83. The current flowing through the transistor 80 renders it conductive for a certain time period sufficient for self-excitation of the system. Next, an opposite sign voltage is fed to the transistor inputs due to the feedback and maintains the transducer in an excited state. In this case the system operates under the most economical flip-flop operating conditions.

In the excited state the alternating-current electric signal through the conductor 61 is applied to the electrode of the piezoelectric spiral. This signal causes variable bending strain of the spiral piezoelectric element due to the inverse piezoelectric effect which results in displacement of the end of the spiral. This displacement through a metal plate 70, which is a continuation of the spiral piezoelectric element, is transmitted to the balance 72. The piezoelectric spiral 60 and the metal plate 70 form a balance hairspring. The balance hairspring and the balance form an oscillating system with concentrated parameters whose natural frequency is determined by the stiffness of the hairspring and the moment of inertia of the balance. Due to the elasticity of thin ceramic films the amplitude of oscillation of the balance (confirmed by tests) can be brought up to 360°. This is fairly sufficient for accurate operation of a clock mechanism.

The feedback voltage appearing on the conductors 63 and 65 due to the piezoelectric effect controls the frequency of the transducer and makes it equal to the natural frequency of mechanical oscillation of the system which may be equal to 0.5–3.0 c/s.

Insignificant consumption of power by the spiral piezoelectric element and high efficiency of the transducer system make it possible to considerably increase the clock rate.

The clock is adjusted for correct running by displacing the rod 66 with the aid of the screw 68 thereby changing within a narrow range the natural frequency of mechanical oscillation of the system.

In the electromechanical drive of the balance clock having a hairspring in the form of a spiral piezoelectric element in the clock mechanism according to the present invention the balance axle performs oscillatory motion. The spiral piezoelectric element can also be used for making a mechanism in which the axle rotates discretely in a single direction.

Such electromechanical systems relate to electric motors and are commonly referred to as step-by-step motors.

Known in the art are step-by-step motors equipped with electromagnetic drives. Such motors are described in great detail in technical literature. They find wide applications in telephony, telemechanics and automatics. However, manufacture of fractional-horsepower step-by-step motors with an electromechanical drive is associated with a variety of difficulties which are also inherent in development of low-power miniature relays and have been mentioned above in the description of the relay according to the present invention.

In this connection, in order to reduce the overall dimensions, consumed power and cost of manufacture of miniature step-by-step motors, the drive of such a motor is preferably made of a spiral piezoelectric element whose movable end turns a toothed wheel for one tooth (pitch) with each voltage pulse applied to the piezoelectric element. The toothed wheel is fixed in each new position by means of a spring.

The piezoelectric element 84 (FIG. 16) in the form of a single-layer or bimorph spiral is rigidly secured by its one end to a support 85 of a housing 86. The spiral piezoelectric element is electrically connected to the tonques 87 and 88 through terminals 89 and 90 to which it is connected by means of conductors 91, 92.

Secured to the free end of the spiral piezoelectric element is a thin flat spring 93 which in its initial position lies on the surface of one of the teeth of a ratchet wheel 94 featuring inner disposition of its teeth. Attached to the face of the ratchet wheel is a clamp 95 in the centre of which there is secured the shaft 96 of the motor. The shaft rotates freely in bearings 97 and 98 (FIG. 16*a*).

A flat spring 99 lies on the surface of one of the teeth of the ratchet wheel 94 and is glued to the housing 86 of the motor.

Glued to the motor housing is a cover 100 accommodating the bearing 97.

On connecting the tongues 87 and 88 to a voltage source, the voltage through the terminals 89, 90 and the terminals 91, 92 is fed to the spiral piezoelectric element 84. The movable end of the spiral piezoelectric element displaces and through the spring 93 turns the ratchet wheel through one tooth.

When the voltage is switched off, the end of the piezoelectric spiral returns to the initial position. The spring 99 prevents the ratchet wheel from rotation in the opposite direction when the end of the spiral is returning to its initial position. The ratchet wheel turns through one tooth (per one step) upon the arrival of each new pulse.

The motor can also operate from an alternating-current voltage (two steps per cycle). In this case, however, the spring 93 must be pressed to the surface of the tooth with a small effort in the initial position (when the electric signal is not applied). The above-described motor is characterized by small input power of the order of 0.1 milliwatt and this permits the motor to be used in accurate timing devices supplied with an electric current both from a built-in power source or from a.c. mains with a frequency of 50/60 c/s.

Considerable mechanical displacements provided by spiral piezoelectric elements allow them to be used as a drive for measuring instruments.

The known electrical measuring instruments are built around sensitive galvanometers with a drive consisting of a permanent-magnet or electromagnetic system. These instruments are disadvantageous in that they have comparatively low input impedance and are complicated in manufacture having a high cost of production. Furthermore, in many cases such instruments have too large overall dimensions and weight to be used in miniature systems.

Attempts have been made to make measuring instruments with a drive in the form of a bimorph piezoelectric element, however, such instruments have found very limited applications since their displacements are insufficient for obtaining high sensitivity.

Another object of the invention is therefore to reduce the dimensions and weight and to increase the sensitivity of electrical measuring instruments.

This object is attained owing to the fact that the drive of an electrical measuring instrument is made in the form of a spiral piezoelectric element one end of which is rigidly secured while the other end is free and is connected to a cup whose axis passes through the centre of gravity of the spiral piezoelectric element. Fixed to the circumference of the cup (or wheel) is a flexible thread the other end of which is wound about the axle of the instrument pointer and is fixed thereto.

One end of the spiral piezoelectric element 101 (FIG. 17) made in the form of a single-layer or bimorph device and having terminals 102 and 103 is secured to a support 104 which is rigidly connected to the instrument housing.

The other end of the spiral piezoelectric elements is connected to a rod 105 which is fixed in the bottom of a cup 106. The rod 105 is capable of turning about its axis through a certain angle.

The axle 107 of the cup 106 (FIG. 17) rotates freely in bearings 108 and 109. Attached to the external side surface of the cup 106 is a thin flexible thread 110 which is wound about an axle 111 and affixed thereto. Mounted on the axle 111 is a pointer 112 whose position is determined on a dial 113. The pointer axle freely rotates in bearings 114 and 115 and is fixed in a specified position by means of a return spring 116.

When an electric voltage is applied to the terminals 102 and 103, the movable end of the spiral piezoelectric element 101 performs motion which through the rod 105 is transmitted to the cup 106. The latter rotates and winds up the thread about itself threby transmitting a linear displacement to the thread which, in its turn, transmits the motion to the axle 111. The rotation of the axle 111 results in a change in the position of the pointer 112 relative to the reading dial 113. When the voltage is switched off, the spring 116 returns the pointer to its initial position.

The displacement of the movable end of the spiral piezoelectric element is proportional to the applied voltage so that the instrument has a linear scale.

Due to the great displacements of the drive the angle of rotation of the pointer can be brought up to 360°. This makes it possible to considerably decrease the dimensions of the dial and, consequently, the overall dimensions of the whole instrument.

Moreover, since the spiral piezoelectric element has a small width, the instrument can practically be made as a flat device. The instrument has a high input impedance which may exceed a magnitude of $10^9$ ohms. In addition, the instrument may be made both as a low-voltage and high-voltage device with a measuring range from 10 volts to a few thousand volts.

When using the proposed measuring instrument for measuring alternating-current voltage, a rectifier built around a bridge circuit or a voltage doubler circuit is mounted at the input of the instrument. In this case an additional smoothing capacitor is not needed since the capacitance of the spiral piezoelectric element is sufficient for bridging the alternating component of the rectified signal.

The measuring instrument with a spiral piezoelectric element has no permanent magnets, therefore its weight is considerably lower than that of measuring instruments of any other type. Jerks of the pointer during measurements are eliminated by connecteng a resistor in series with the spiral piezoelectric element. By selecting the value of this resistor, the time constant of the period of charging and discharging the intrisic capacitance of the spiral piezoelectric ric element may be varied within a wide range. In this connection, the proposed instrument needs no mechanical damping during the measurement. This is a particular advantage of the measuring instrument with an electromechanical drive in the form of a spiral piezoelectric element.

At the present time the solution of a number of technical problems is associated with a necessity of separation of a background noise of a useful signal with a frequency below 50 c/s.

These problems are solved by using passive LC filters, active RC filters as well as passive piezoelectric filters. These filters, however, in many cases do not comply with the requirements of low weight and small overall dimensions, while their characteristics are not in conformity with the up-to-date standards.

For example, LC filters at these frequencies have extremely large dimensions and weight while their quality factor, at best, is equal to 10. Moreover, they are expensive and unreliable in operation due to the presence of windings. The active RC filters have almost the same disadvantages due to the fact that they must be equipped with an active element and high-stability capacitors of high capacity. The dimensions of such elements are also very large. In addition, active RC filters have other disadvantages such as a limited level of an input signal, a possibility of their self-excitation, low quality factor (Q does not exceed 50), etc.

Known in the art are piezoelectric transfilters, i.e. low-frequency devices consisting of a filter and a transformer made as an integral unit comprising a piezoelectric element in the form of a cantilevered bimorph plate carrying a mass on its free end (such devices, for example, are described in the book edited by G.W. Katz "Solid State Magnetic and Dielectric Devices," part I page 232, "Energy" Publishers 1964).

The chief disadvantage of these filters consists in their large dimensions at low frequencies when the length of the bimorph elements becomes too large. The other disadvantage of these filters consists in that they cannot operate under the action of constant and variable mechanical loads since even small efforts applied to the mass result in considerable bending and even breaking of the plates or, if the filter is equipped with a mass travel limiter, put the filter out of work during the action of an overload.

These disadvantages can be eliminated by making the piezoelectric transducer in the form of a piezoelectric element one end of which is rigidly secured while the other (free) end is connected to an inertia mass made in the form of a rotary wheel, namely, a piezoelectric transfilter which is an object of the present invention.

The filter includes a spiral piezoelectric elements 117 (FIG. 18) whose inner and outer surfaces are coated with electrodes. One end of the spiral piezoelectric elements is fixed to a stationary support 118 pressed into the lower portion of the housing 119 and serving simultaneously as a terminal for the internal electrode of the spiral piezoelectric element. The other end of the piezoelectric elements is attached to a rod 120 rigidly secured on an inertia wheel 121. The inertia wheel 121 is mounted on an axle 122 the ends of which rest in two corundum bearings 123 and 124 disposed in the apertures of the housing 119 and the cover 125 of the device (FIG. 18*a*). The cover is fixed by means of pins 126 and 127 pressed into the housing 119 and is glued to the housing.

The sections of the spiral piezoelectric element coated with electrodes are connected to terminal rods 118, 128 and 129 through current conductors in the form of thin wires. The terminal rods are led to the outside of the housing and are electrically connected to terminal tongues (shown in FIG. 118 are two tongues 130 and 131 connected to the terminal rods 128 and 129).

The inner surface of the spiral piezoelectric element 117 is completely coated with an electrode 132 as it is conventionally shown in FIG. 19*a*, while the outer surface thereof is coated with two electrodes 133 and 134 dividing this surface into two parts. If a single-layer spiral piezoelectric element (117 in FIG. 19*a*) is used, the terminals are provided from all the electrodes 132, 133 and 134.

For example, the electrodes 132 and 133 are input electrodes, whereas the electrodes 132 and 134 are output electrodes (FIG. 19*b*), while in the case of a bimorph spiral piezoelectric element 135 (FIG. 19*b*) the electrodes 136 and 138 can be used as input electrodes and the electrodes 137 and 138 as output electrodes.

When a source of an electric signal is connected to the input electrodes, an electric signal is taken off from the output electrodes. The maximum value of this output signal is attained at a resonant frequency of the mechanical oscillation of the system. The resonant frequency of oscillation of the system without an inertia mass is equal approximately to 10 c/s, while with an inertia mass it can be reduced to 1 c/s.

The voltage transmission factor is determined as a ratio of the output signal to the input signal and can be equal to 2–6 depending on the piezoceramic material.

The above-mentioned low-frequency transfilter has a limited voltage transmission factor and in some cases this is a disadvantage.

In order to increase the voltage transmission factor, the piezoelectric transfilter is made in the form of two spiral piezoelectric elements having one end rigidly fixed to a support and the other end connected to an inertia mass shaped as a wheel.

According to the functional diagram, the inertia wheel 139 (FIG. 20) mounted on an axle 140 is capable of rotating in bearings 141, 142. The wheel 139 has a retainer 143 to which are fixed the movable ends of spiral piezoelectric elements 144, 145. The other ends of these elements are rigidly connected to supports 146, 147 which are mounted in the housing of the transfilter.

The connection of the terminals 148, 149, 150, 151 is shown in FIG. 21 (*a*, *b*) where (*a*) is a connection of the spiral piezoelectric element 144 and (*b*) is a connection of the spiral piezoelectric element 145. The direction of polarization of the piezoelectric material is shown in this figure by arrows.

When a voltage is applied to the piezoelectric element 144, its end performs oscillatory motion which through the retainer 143 causes deformation of the element 145. Due to the piezoelectric effect a voltage is generated in the element 145, the magnitude of which is maximum at the resonant frequency of the entire oscillatory system. The series-parallel connection of the two spirals as well as the difference in their thickness results in that such a system can change the input voltage by amplifying it by a factor of 30 to 50. Thus, the spiral piezoelectric element can be used as a voltage transformer having very high input and output impedance, for example, for amplifying the voltage of a signal at industrial frequency of 50 or 60 cycles per cycles per second.

The spiral piezoelectric element makes it possible to utilize another very important property, namely electrical or mechanical control of the resonant frequency.

The known piezoelectric elements with excitation, for example, of longitudinal waves practically cannot be returned to another frequency like in the case of an LC tuning circuit by changing the capacitance or inductance. This is a serious disadvantage of the selective piezoelectric systems.

The construction of a piezoelectric filter shown in the functional diagram (FIG. 22) allows this disadvantage to be eliminated at least in the case of a low-pass filter.

This is attained due to the fact that the mass on the movable end of the spiral piezoelectric element is made of a ferromagnetic material which is acted on by a magnetic field the intensity of which is changed electrically or mechanically.

The spiral piezoelectric element 152 has a mass 153 made of soft or hard magnetized material secured on its movable end. This mass is placed into the gap of an annular magnetic circuit 154 having a winding 155. The voltage is applied to the spiral piezoelectric element through terminals 156 and 157.

Under the action of a constant magnetic field the magnetic mass 153 is affected by a certain force which is balanced by the reaction force of the spiral 152. In this case the natural frequency has found to be dependent on the magnitude of this force which, in its turn, depends on the intensity of the current flowing through the winding 155 or on the disposition of the mass 153 relative to the poles of the electromagnet.

Consequently, by changing the current in the winding 155 or by turning the magnetic circuit 154, we can change the natural frequency of oscillation of the mechanical system spiral-mass. This allows us to retune the resonant frequency of the piezoelectric transfilter by 30 per cent.

The low cost of the spiral piezoelectric elements in connection with a sufficient effort developed at the end of the spiral make it possible to find still another application of the proposed elements, namely in signalling devices.

Known in the art are signalling devices made in the form of two metallic resonators between which is placed their exciter made in the form of a flat-shaped piezoelectric transducer (c.f. U.S. Pat. No. 3,218,636, cl. 340–392 "Piezoelectric Signalling Device").

The disadvantage of such a device consists in a relatively high price of a piezoelectric transducer and also in insufficient intensity of the audio signal which for the most part is determined by the output power of the piezoelectric transducer.

Thus, still another object of the invention is to reduce the cost of a signalling device and to increase its output power.

This object is attained owing to the fact that the exciter of the signalling device is made in the form of a spiral piezoelectric element one end of which is rigidly secured and the other end is provided with a hammer (mass).

Attached to a plastic backing 158 (FIG. 23) by means of a screw 159 is a resonator 160 having in its centre a rod 161 to which is connected the end of a spiral piezoelectric element 162. A hammer 163 is secured to the movable end of the spiral piezoelectric element. A cover 168 is fixed to the backing 158 by means of supports 164, 165, 166, 167. The cover 168 has apertures for the terminals 169 and 170 of the spiral which are soldered to output tongues 171, 172.

The device is mounted through metal straps 173, 174 having mounting holes 175, 176, 177, 178.

When an alternating-current voltage is applied to the tongues 171, 172, the spiral piezoelectric element 162 actuates the hammer 163 which strikes the resonator 160 and excites an audio signal therein. The device can operate from a voltage with a frequency of 30 c/s generally employed in telephone sets as well as from 50 or 60 c/s mains. Still another application of the spiral piezoelectric elements consists in their use as devices converting electric energy into sound energy and vice versa, for example, in dynamic loudspeakers.

Dynamic loudspeakers are usually provided with electromechanical systems built around permanent magnets which considerably increase the weight of the loudspeaker. Moreover, dynamic loudspeakers are featured by a low input impedance, particularly at low frequencies. This necessitates utilization of matching transformers in the circuits of dynamic loudspeakers. Another disadvantage of dynamic loudspeakers is their high cost.

An object of the present invention is to reduce the weight of a dynamic loudspeaker, its cost and to increase its input impedance at low frequencies.

This object is attained owing to the fact that the electromechanical system of a loudspeaker is made in the form of two spiral piezoelectric elements whose movable ends are connected to the loudspeaker horn through a rod.

Referring now to the functional diagram shown in FIG. 24, two spiral piezoelectric elements 179, 180 are connected by their movable ends to a rod 181 which is secured in the apex of a conical horn 182 whose base is secured to the body of the dynamic loudspeaker. The spiral piezoelectric elements through their terminals 185, 186, 183, 184 are connected to the output of a low-frequency amplifier.

As a rule, the spirals are connected in parallel and their oscillations are coherent. If the oscillations of the spirals are not coherent, the position of the terminals, say 183 and 184, must be interchanged. The coherent audiofrequency oscillations of the spirals are transmitted to the horn through the rod 181 and the horn radiates sound waves into space.

At least two spirals are necessary to provide for adequate power of radiation of sound waves and, when located symmetrically relative to the rod 181, the spirals prevent any bending strain of the rod which would cause distortions of the frequency response characteristic of the loudspeaker.

In this case the input impedance of the proposed dynamic loudspeaker is almost 1000 times higher as compared with that of the conventional dynamic loudspeaker. The weight of the exciter is much lower than that of the known electromagnetic exciters. In addition, during mass production, the cost of dynamic loudspeakers with a spiral exciter should be lower than that of conventional loudspeakers known at the present time.

We claim:

1. A method of making a single-layer piezoelectric element in the form of a ribbon-shaped close-coiled spiral, which comprises:

a. laying one unfired piezoelectric ribbon upon another unfired piezoceramic ribbon, one of said ribbons containing in the composition thereof a substance based on oxides sintered at a temperature of 900° to 1300°C and an organic substance, the other ribbon containing in the composition thereof a substance based on oxides sintered at a temperature of 1350° to 1400°C;

b. coiling the ribbons into a spiral;

c. firing the ribbons at a temperature of 900 to 1300°C;

d. cooling the spiral structure; and e. removing the substance based on oxides sintered at a temperature of 1350° to 1400°C from the gaps between the turns of the spiral.

2. The method of claim 1 further including the steps of immersing the spiral into a liquid paste containing salts or oxides of metals, removing the spiral from the liquid, drying the spiral, firing the spiral at a reducing temperature to obtain the metals from the salts or oxides thereof, and removing the extra metallic coating from the spiral.

3. The method of claim 1 wherein sections of the ribbon containing a substance based on oxides sintered at a temperature of 900° to 1300°C are coated with a film of a paste of salts or oxides of a metal, prior to laying the ribbons one upon the other.

4. The method of claim 3 wherein the metal employed in the paste is platinum.

5. A method of making a double-layer piezoelectric element in the form of a ribbon-shaped close-coiled spiral, which comprises:

a. coating two unfired piezoceramic ribbons with a film of a paste of salts or oxides of a metal, each of said ribbons containing in the composition thereof a substance based on oxides sintered at a temperature of 900° to 1300°C and an organic substance;

b. laying the two ribbons one upon the other;

c. pressing the ribbons together;

d. laying on the pressed ribbons a third unfired piezoceramic ribbon, said third ribbon containing in the composition thereof a substance based on oxides sintered at a temperature of 1350° to 1400°C;

e. coiling the ribbons into a spiral;

f. firing the ribbons at a temperature of 900° to 1300°C;

g. cooling the spiral structure; and h. removing the substance based on oxides sintered at a temperature of 1350° to 1400°C from the gaps between the turns of the spiral.

* * * * *